Nov. 3, 1970     LEROY VICK     3,537,692

HUMIDIFIER

Filed Aug. 29, 1967     2 Sheets-Sheet 1

INVENTOR
LEROY VICK

ATTORNEYS

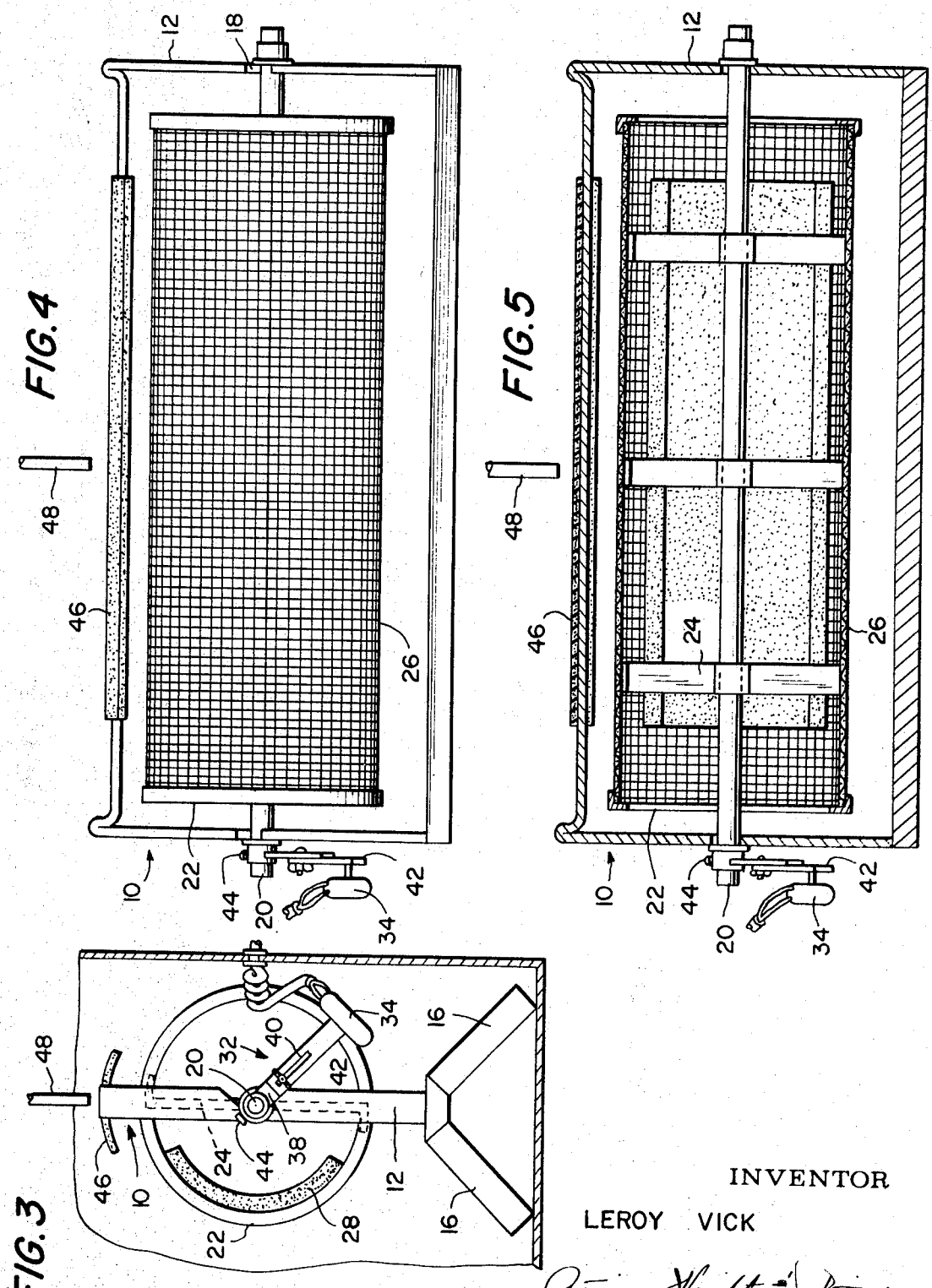

United States Patent Office 3,537,692
Patented Nov. 3, 1970

3,537,692
HUMIDIFIER
Leroy Vick, 107 Aberdeen Road, Rockville, Md. 20850
Filed Aug. 29, 1967, Ser. No. 664,042
Int. Cl. B01f 3/04, 15/06
U.S. Cl. 261—39               1 Claim

ABSTRACT OF THE DISCLOSURE

A device for humidifying air emitting from a hot air furnace which includes an absorbent material within a hot air plenum associated with a source of water discharging onto the absorbent material under influence of electrically operated control over the water source, said electrical control being responsive to the degree of saturation or weight of the absorbent material and a humidistat in circuit with said controls.

---

The present invention relates to new and useful improvements in humidifiers and more particularly and specifically to apparatus for automatically producing humidification within an air circulating system in a home, building or the like.

Heretofore, it has been practice to maintain a certain humidity level within a home or other building by the utilization of complex and costly components to inject water vapor into the circulating air system, heating or air conditioning, within the home or building. Such prior known humidifiers have necessarily incorporated expensive modification of existing heating or air conditioning systems when installation of the humidifier has been made as an improvement to a prior existing air circulating system.

It is a primary object of the present invention to provide a humidifier capable of being installed as a part of the original equipment for a heating or air conditioning system for a home or other building which is equally capable of low cost, quick installation as an improvement to a prior existing system.

It is another object of this invention to provide a humidifier which may be readily and inexpensively installed in conjunction with air heating or air conditioning systems to automatically control the humidity level of air circulating within said system to any preselected level of humidity.

It is still another object of this invention to provide humidifier apparatus which is extremely simple and inexpensive of design and manufacture and which may be readily and inexpensively installed as a component part of a heating or air conditioning system within a home or other building structure and which is simple and substantially maintenance free in operation and service.

A still further object and advantage of this invention lies in the provision of a humidifier the controls for which will operate on a twenty-four volt system permitting the electric circuits therefor to be conveniently wired into the normal furnace burner transformer and avoiding the requirement for special circuits to be established for installation of the humidifier.

Still other objects and advantages of this invention will become more readily apparent to one skilled in the art when the following general statement and description are read in the light of the appended drawings.

The nature of the present invention may be described in general terms as relating to component apparatus for installation in conjunction with a heating or cooling air system for a home or other building which serves to automatically entrain within said circulating air system water vapor or moisture in response to an automatic humidistat control to maintain a preselected level of humidity within said air circulating system, said apparatus including a rotating cage element having an intersticed skin surface, an absorbent mass within said cage structure, a source of water communicating with said absorbent mass within said cage, a humidistat within the path of circulating hot or cool air of the system, and controls associated with said cage and said humidistat for automatically maintaining a preselected moisture content within said mass.

Referring now to the accompanying drawings in which like numerals designate similar parts throughout the several views:

FIG. 3 is a front elevation of the apparatus of FIG. 2;

FIG. 4 is an end view of the apparatus of FIG. 2; and

FIG. 5 is a vertical section taken on line 5—5, FIG. 2.

Figure 1:
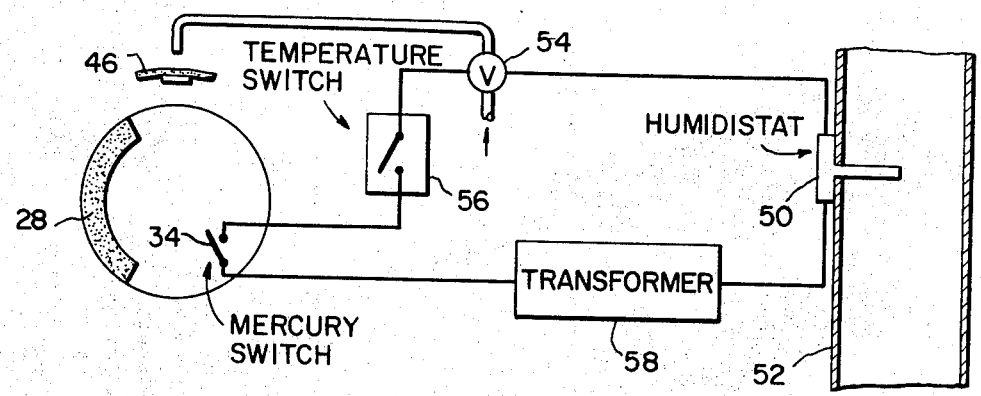
FIG. 1 is a schematic view of the humidifier installation constituting the present invention.
Figure 2:
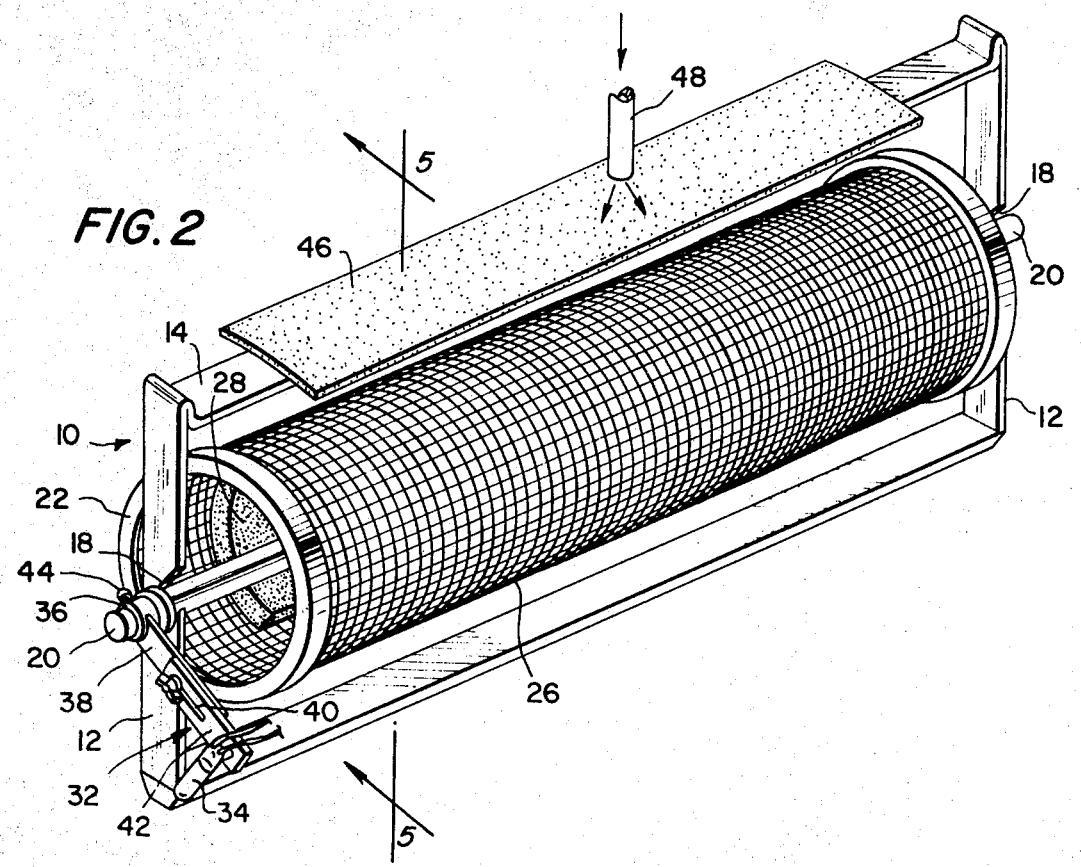
FIG. 2 is a perspective view of the rotatable humidifier cage.

With reference to the accompanying drawings there is illustrated for purposes of example rather than limitation humidifier apparatus within the concept of the present invention installed in conjunction with the cooling coil of a household air conditioning unit associated with the circulating air duct system within the home. It is to be understood that humidifier apparatus made within the scope and contemplation of this invention may likewise be installed within the hot air plenum of the conventional hot air heating system of a home or building, or within any of the delivery duct areas of such a system at a centralized distribution point therein.

In the embodiment illustrated, the humidifier consists of an elongated rectangular frame 10, composed of two vertical legs 12 and a top bridging member 14 interconnecting the upper extremities of said legs. In the form illustrated, the legs 12 are secured at spaced points longitudinally of the upper surface of the conventional cooling coil 16 of an air conditioning unit. The vertical legs 12 are provided at horizontally aligned points with arcuate slotted openings 18 adapted to receive and rotatably support the remote ends of an axle or shaft 20. The axle or shaft 20 mounts concentrically thereabout a cylinder or drum 22 having a rigid frame 24 and a wire or screen covering surface 26 thereon. Within the perforated drum a wettable mass 28, formed of natural or synthetic sponge or like material, is secured to the inner surface of the wire or screen skin to extend longitudinally of the drum or cylinder through an approximate ninety degree sector thereof. An adjustable counterweight 32 is secured to the axle or shaft 20 on an extended end thereof and supports a mercury type micro-switch 34. The adjustable counterweight consists of a cylindrical boss 36 having an elongated arm 38 formed perpendicularly therefrom which is slotted as at 40 to permit the adjustable positioning lengthwise of the arm of a weighted slug or plate 42. The boss element 36 is provided with a set screw fastener 44 to permit the selective positioning of said boss radially of said axle or shaft 20 for the purpose of setting the positioning of the rotatable cylinder or drum with the wettable mass in an upper quadrant thereof, as illustrated, with the counterweighting forces normally maintaining said cylinder in the illustrated position when the wettable mass is dry or has a moisture content below a certain preselected level.

The upper bridge section 14 of the humidifier frame is provided longitudinally thereof with a spreader sponge or mass 46 which receives liquid through a liquid feed pipe 48, and which in turn distributes the liquid received therefrom downwardly onto the perforated cylinder exteriorly of the wettable mass 28 therein.

Associated with the component apparatus hereinabove described is a control system, as illustrated in FIG. 1 of the drawings, consisting of a humidistat 50 positioned within a return air duct 52 in the air circulating system which is wired in series with an electrically controlled water valve 54 in the feed water line to the spreader sponge 46, a temperature responsive switch 56 in the chamber containing the humidifier, the mercury micro-switch mounted on the rotating drum, and a source 58 of low voltage current such as a furnace transformer.

When placed in operation the control circuit is energized from the source 58 of electrical energy and subject to initiation and actuation of the humidistat and temperature responsive valve, the water valve is opened or closed to introduce water onto the spreader sponge 46 above the rotatably mounted cage. When the spreader sponge becomes saturated it spills or directs water downwardly onto the perforated cage and into contact with the wettable mass 28 secured within a quadrant of the cage. When the wettable mass attains a preselected level of moisture content, its weight overcomes the countering forces of the counterweight 32 causing rotation of the cage under the influence of the eccentrically located mass thereby moving the micro-switch 34 to a position wherein it opens, deenergizing the control circuit and closing the water valve. As moisture is picked up by the circulating air system from the wettable mass within the cage and from the spreader sponge, thereby increasing the humidity level of the circulating air, the wettable mass within the cage will dry out, reducing its weight and permitting the force of the counterweight to return the rotatable cage to the position illustrated in the drawings, thereby opening the micro-switch and actuating the control circuit. When reactivated, the control circuit is again subject to the influence of the humidistat in the return air duct in order that the water valve may again be opened under influence of the control circuit when the humidity level in the air passing through the return air duct is reduced below the preselected control level for which the humidistat has been set, thus recycling the humidifier as hereinbefore described.

It may be readily seen that the humidifier apparatus shown and described produces at low cost and with simple and maintenance free operation an automatic means for introducing moisture into an air circulating system which is fully responsive to a typical humidistat control located within the circulating air system. It is further evident that apparatus of the type illustratively disclosed may be readily and inexpensively installed in existing heating or air conditioning systems with a minimum of electrical and plumbing installation for effectively controlling humidity level within the circulating system.

Having thus described and explained the construction and operation of the humidifier constituting the present invention without intent to limit the same beyond the requirements of the prior art and the appended claim, what I desire to claim is:

1. Humidifier apparatus for use in association with a recirculating air system comprising an upstanding frame mounted within the path of the recirculating air system, an axle supported horizontally of said frame and rotatable relative thereto, a perforated cage secured on said axle for rotation therewith, a wettable absorbent mass secured within a sector of said cage, a source of water communicating through a control valve with said wettable mass, a humidistat in the path of said recirculating air system having operable connection with said water control valve, a counterweight fixed to said axle and positioned relative to the axis thereof to counterbalance the absorbent mass within said cage, a micro-switch connected to said counterweight and having operable connection with said water control valve, whereby an increase in the water content of said wettable mass above a preselected level will induce rotation of said cage against the influence of said counterweight to actuate said micro-switch and close said water control valve.

References Cited

UNITED STATES PATENTS

| 2,142,423 | 1/1939 | Timmis | 261—129 X |
| 2,359,278 | 10/1944 | Allen et al. | 236—44 X |
| 2,427,714 | 9/1947 | Cooper | 261—83 X |
| 3,198,433 | 8/1965 | Crutcher | 236—44 |

RONALD R. WEAVER, Primary Examiner

U.S. Cl. X.R.

261—66, 83; 236—44; 126—113